US011161586B2

(12) United States Patent
Wesseloh et al.

(10) Patent No.: US 11,161,586 B2
(45) Date of Patent: Nov. 2, 2021

(54) INSULATION PACK HAVING DRYING OPENINGS, FOR THERMALLY AND ACOUSTICALLY INSULATING AN AIRCRAFT

(71) Applicant: Airbus Operations GmbH, Hamburg (DE)

(72) Inventors: Marc Wesseloh, Hamburg (DE); Rainer Mueller, Hamburg (DE); Markus Kerber, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 356 days.

(21) Appl. No.: 16/421,393

(22) Filed: May 23, 2019

(65) Prior Publication Data

US 2020/0001962 A1 Jan. 2, 2020

(30) Foreign Application Priority Data

Jun. 28, 2018 (DE) .......................... 102018115614.6

(51) Int. Cl.
 *B64C 1/40* (2006.01)
 *B64D 13/06* (2006.01)
 *B64C 1/06* (2006.01)

(52) U.S. Cl.
 CPC ................ *B64C 1/067* (2013.01); *B64C 1/40* (2013.01); *B64D 2013/0625* (2013.01)

(58) Field of Classification Search
 CPC ........ B64C 1/067; B64C 1/40; B60R 13/0892

USPC ....................................................... 296/181.6
See application file for complete search history.

(56) References Cited

U.S. PATENT DOCUMENTS

| 6,491,254 | B1 * | 12/2002 | Walkinshaw | ............ | A62C 3/08 244/118.5 |
| 9,211,945 | B2 * | 12/2015 | Redecker | ................ | B64C 1/067 |
| 9,944,379 | B2 * | 4/2018 | Berryessa | ................ | B64C 1/40 |
| 2013/0009010 | A1 * | 1/2013 | Auriac | .................... | B64C 1/403 244/129.1 |

FOREIGN PATENT DOCUMENTS

DE    102010052671 A1    5/2012

* cited by examiner

*Primary Examiner* — Christopher D Hutchens
*Assistant Examiner* — Madison Elizabeth Dittner
(74) *Attorney, Agent, or Firm* — Greer, Burns & Crain, Ltd.

(57) ABSTRACT

An insulation pack for thermally and acoustically insulating an aircraft has a mat formed from an insulation material, and a casing film which completely encases the mat. The casing film has drying openings, each closable a cover that is connected to the casing film. Each cover has a coating substance, the planar extent of which varying as a function of the relative air humidity of the air in the interior of the insulation pack such that each cover moves relative to the casing film, as a function of air humidity. The associated covers are adapted for assuming an orientation which, below a predetermined relative air humidity, closes the associated drying opening and which, at higher relative air humidity values, at least partially opens the associated drying opening.

15 Claims, 3 Drawing Sheets

INSULATION PACK HAVING DRYING OPENINGS, FOR THERMALLY AND ACOUSTICALLY INSULATING AN AIRCRAFT

CROSS-REFERENCE TO PRIORITY APPLICATION

This application claims the benefit of, and priority to, German patent application number DE 102018115614.6, filed Jun. 28, 2018. The content of the referenced application is incorporated by reference herein.

TECHNICAL FIELD

Embodiments of the subject matter described herein relate generally to an insulation pack for thermally and acoustically insulating an aircraft, and to an aircraft having an aircraft hull having an interior space formed therein, at least one such insulation pack being disposed in said interior space.

BACKGROUND

Insulation packs having a bulked insulation material which is surrounded by a casing film are usually used for thermally and acoustically insulating aircraft. In order to avoid any bursting of the casing film by virtue of the decreasing cabin pressure when ascending, it is provided that ventilation openings are integrated. In conjunction with an external skin which is very cold when cruising, condensation can arise in hull regions close to the external skin, said condensation in the case of insulation packs that are not closed in an air-tight manner potentially leading to an accumulation of condensation water in said insulation packs.

Various measures for preventing an accumulation of moisture in insulation packs are known. For instance, an insulation assembly having insulation packs in which all casing films of the insulation packs are embodied so as to be air-tight and water-tight is known from patent document DE 10 2010 052 671 A1, wherein the insulation packs have ventilation openings which penetrate the casing films and which are disposed in such a manner that said ventilation openings are fluidically connected to a gap that is formed between the insulation assembly and the hull wall. Said ventilation openings absorb air only from a very dry region, this significantly reducing the accumulation of condensation water in the insulation packs.

BRIEF SUMMARY

It is an object of the disclosure to propose an insulation pack for thermally and acoustically insulating an aircraft, said insulation pack likewise preventing the accumulation of condensation water and, in the case of condensation water that has nevertheless accumulated, and being capable of discharging said condensation water again by way of drying.

The object is achieved by an insulation pack having the features of independent claim 1. Advantageous embodiments and refinements are to be derived from the dependent claims and from the description hereunder.

Proposed is an insulation pack for thermally and acoustically insulating an aircraft, said insulation pack having a mat from an insulation material, and a casing film which completely encases the mat, wherein the casing film has a plurality of drying openings which are in each case closable by a cover that is connected to the casing film, wherein each cover at least in regions has a coating substance, the planar extent of the latter varying as a function of the relative air humidity of the air in the interior of the insulation pack such that each cover as a function of said air humidity moves relative to the casing film, and wherein the covers are adapted for assuming an orientation which, below a predetermined relative air humidity, closes the associated drying opening and which, at higher relative air humidity values, at least partially opens the associated drying opening.

The fundamental construction of the insulation pack according to the disclosure is comparable to that of a conventional insulation pack. A mat from an in particular bulked insulation material which is encased with the casing film is provided. The casing film can be based on various materials. Plastics materials which are flexural are particularly suitable. Single-tier and multi-tier casing films are conceivable. Said casing films can also have a woven-fabric tier, when required. The casing film, or at least one of the tiers present in the casing film, is preferably produced from a fluid-tight material.

The casing film, like known casing films, can at least in regions be provided with at least one ventilation opening. The latter permits an equalization of pressure in the interior of the insulation pack so as to preempt any damage to the insulation pack and to suppress any inflation of the insulation pack during the ascent.

According to the disclosure, the drying openings which are closable by a cover are provided additionally thereto. The purpose of these additional drying openings lies in carrying out drying of the insulation pack when required, in that air having a lower air humidity than in the insulation mat can be directed into the latter. The covers which as a function of relative air humidity in the proximity of the insulation material open or close in a self-acting manner are provided for opening the drying openings when required.

The cover is a planar element which is dimensioned in such a manner so as to close an associated drying opening. A cover can in particular be embodied as a planar element which is capable of closing a drying opening. The design embodiment of the cover consequently correlates with the design embodiment of the associated drying opening. The drying opening is closed when the cover is placed on top of said drying opening.

A cover for this task can at least in regions have a coating substance, the properties of the latter changing when absorbing moisture from the air. In the case of increasing relative air humidity at the associated drying opening, the cover is to be at least partially opened and to be closed again in the case of decreasing air humidity.

The coating is selected from a series of materials which are hygroscopic and when in contact with moisture from the environment bind said moisture. In the case of a suitable selection of the coating substance, the latter can carry out a volumetric increase, a force which moves the cover resulting from said volumetric increase. The cover overall consequently has a hygromorphic behavior.

While the coating could be disposed on a side of the cover that faces the insulation mat, a further coating on a side of the cover that faces away from the insulation mat would also be possible in addition to the former. Said latter coating could, for instance, carry out a volumetric reduction when contacting air having a low relative air humidity, such that a force acting on the cover is likewise exerted on this side. The suitable material then would have to be chosen in such a manner that a reduction in the relative air humidity leads to a contraction of the coating substance.

It is imaginable for the drying openings implemented according to the disclosure to be provided only in the regions in a strip-shaped portion on the insulation pack. Said strip-shaped portion could have a double-tier construction and complement an otherwise single-tier casing film.

Accordingly, the insulation pack can likewise have a low weight, like widely used insulation packs. Nevertheless, drying, when required, is possible without active elements. A permanently opened perforation is not required; rather, self-regulated drying of the encased insulation material is achieved in a very simple manner.

The cover in one advantageous embodiment is flexural. The cover thus does not offer any notable resistance counter to a bending movement. This embodiment imparts to the cover in particular the capability of carrying out a rolling-up movement. In the case of a one-sided coating which expands as the relative air humidity increases, the composite of the cover and the coating can consequently develop a shear force at the interface between the coating and the cover. This leads to the cover rolling such that said cover moves away from the drying opening.

Alternatively thereto, the cover can also be rigid. A coating with the coating substance can consequently also be carried out only in a connection region to the casing film, said connection region hereunder also being referred to as the hinge region. In the case of an expanding coating substance the cover performs a flap movement. The coating substance can be limited to a very small face and under the effect of a lever arm in relation to the hinge region push the cover away from the drying opening.

The coating substance in one advantageous embodiment has an absorber which in terms of the volume thereof increases when absorbing moisture. An absorber can be a substance which absorbs moisture. The absorber can in particular be a super absorber which is capable of absorbing a multiple of its own weight in water from the air humidity. As has been illustrated above, an expansion which leads to a movement of the cover can be performed on account thereof.

The absorber is particularly preferably capable of reversibly swelling. A swelling of the absorber can consequently be reversed by evaporation and consequently lead to a closing movement of the covers by way of a volumetric reduction. The coating substance overall can be composed of such a swelling-capable material.

The coating substance can comprise at least one bipolar cross-linked polymer which when absorbing water forms a hydrogel. Such a hydrogel can comprise, for instance, polyacrylamide or polyvinylpyrrolidone, however also natural polymers such as cellulose, amylopectin, gelatin, or derivates thereof.

The coating substance can however also comprise a swelling-capable copolymer. Besides cross-linked copolymers based on potassium salt, the afore-mentioned could also comprise composite materials from thermoplastics and elastomers.

Other usable materials could inter alia also comprise swelling-capable fibers. Besides natural fibers, certain carbon allotropes such as, for instance, graphene would also be conceivable. Furthermore, various protein-based coating substances could also lead to a swelling behavior.

It is particularly preferable for the coating to be disposed on an internal side of the cover. The internal side of the mat thus faces the insulation material such that the internal side of the cover is at all times directly confronted with the relevant relative air humidity of the air enclosed in the insulation material. Moreover, the afore-mentioned coating substances are based on water absorption which only once in contact with the humid air leads to an expansion and, on account thereof, move the cover away from the insulation material.

The cover can have a non-woven material as a carrier material. Accordingly, the cover could be made separately from the casing film and have a particularly light carrier material which is provided with the coating. The composite of the carrier material and the coating should be fluid-tight such that an additional fluid-tight tier could also be provided independently of the coating substance.

Alternatively thereto, the cover can be formed from a portion of the casing film which has an edge that coincides with an opening edge of the associated drying opening. The casing film can consequently obtain integrated covers by cutting the drying openings when an edge of the cover that forms a hinge region transitions to the casing film. An edge which subsequently holds the cover, or functions as a transition between the casing film and the cover, respectively, should therefore be spared when cutting the drying openings.

In order for the tightness of covers of this type to be improved, the portion on the periphery can have a tab for overlapping peripheries of the drying openings. Despite the integral manufacture, the covers can then perform sealing of the drying openings in an overlapping manner. This would be made possible by using two films which, placed on top of one another, form the casing film, an external film being provided with larger drying openings than the internal film, and wherein the portion of the external film comes to overlap with peripheries of the drying openings of the internal film. Following the preceding example, the internal film on a side that faces the insulation mat can be provided with the coating substance.

It could be expedient for the drying opening to be at least in part embodied so as to be circular, oval, or triangular. The triangular shape is particularly expedient since one side of the respective triangle can coincide with an edge of the drying opening and a triangle tip that is disposed so as to be spaced apart from said edge is freely movable. In particular when a flexural material of the cover is used, the shear force created can be directed into a particularly advantageous curling movement, commencing at the tip of the triangle.

The disclosure furthermore relates to an aircraft, having an aircraft hull having an interior space formed therein, at least one insulation pack as previously described being disposed in said interior space.

The aircraft hull can have an internal side and an external side, for instance, wherein a plurality of insulation packs are disposed on the internal side of the aircraft hull, and wherein the drying openings are disposed on a side of the insulation packs that faces away from the aircraft hull. Such an insulation pack, as a primary insulation pack or secondary insulation pack, can be situated on skin areas of the hull or on one or a plurality of cladding elements that face a hull skin. Furthermore, insulation packs can also be disposed on structural components such as, for instance, frames, longitudinal beams, or the like.

Furthermore, at least one insulation pack can also be disposed on an installation element which is fastened in the interior space. Such an installation element can be, for instance, a monument, a baggage compartment, a floor element, a side-cladding element, a ceiling-cladding element, or the like.

Overall, the drying openings are to be attached in a targeted manner such that said drying openings are capable of absorbing comparatively dry air. To this end, the drying openings could be disposed in regions of the respective insulation packs which protrude into a cavity between cladding elements and hull frames, or into a gap between installations, or the like. Furthermore, the drying openings could be disposed on a planar portion of the insulation packs and/or in peripheral regions.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages, and potential applications of the disclosed subject matter are derived from the description hereunder of the exemplary embodiments and the figures. All of the features which are described and/or are illustrated pictorially form, individually and in any combination, the subject matter of the disclosure also regardless of their inclusion in the individual claims or the dependency references thereof. Furthermore, in the figures, the same reference signs refer to identical or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
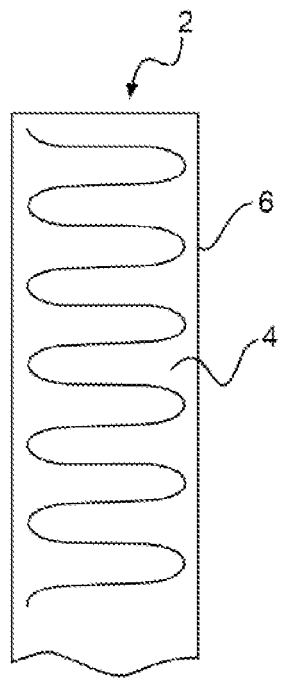
FIG. 1 shows an insulation pack according to the prior art in a very simplified schematic illustration.

FIG. 1 shows the fundamental construction of an insulation pack 2 according to the prior art. The insulation pack 2 has a mat 4 made from an insulation material, and a casing film 6 which encases the mat 4. The material of the mat 4 is bulked and can comprise glass wool, foam, or similar. The casing film 6 is preferably embodied so as to be fluid-tight such that a passage of moisture between an environment of the insulation pack 2 and the mat 4 through the casing film 6 is not possible.

Figure 2A:
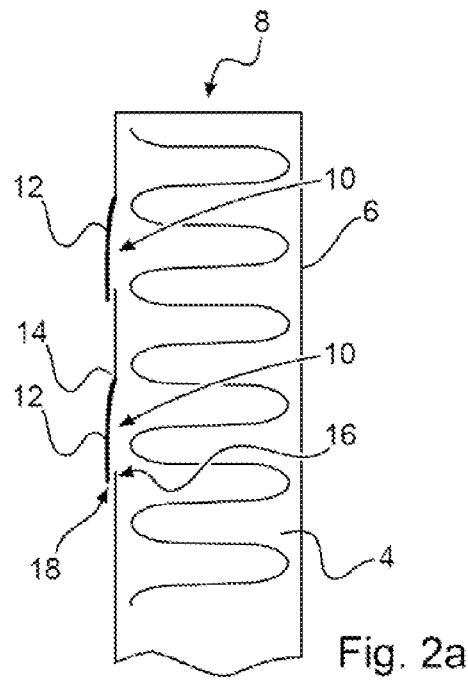
FIGS. 2a and 2b show an installation pack having closed drying openings.

FIG. 2a shows an insulation pack 8 which is constructed so as to be based on the insulation pack 2 according to the prior art. However, additional drying openings 10 in the form of holes in the casing film 6 are provided here, said drying openings 10 being in each case closable by a cover 12. The covers 12 extend from a first opening edge 14 beyond an opposite second opening edge 16 such that an overlap 18 is performed at least with parts of an opening contour of the drying openings 10. In the case shown, the thickness of the covers 14 is in the same magnitude as that of the casing film 6 and can be composed of the same material.

Figure 2B:
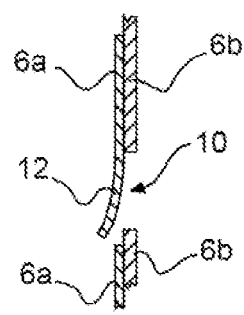

The cover 12 can preferably be cut from the casing film 6. FIG. 2b illustrates how an overlap can nevertheless be produced. For instance, when the casing film 6 is produced from two tiers 6a and 6b, the cover 12 can be disposed in an external tier 6a and in an overlapping manner close the drying opening 10 that is situated in an internal tier 6b. To this end, the drying opening 10 is to be dimensioned so as to be smaller than the extent of the cover 12.

The insulation pack 8 can have a multiplicity of such drying openings 10 which are in each case covered by an associated cover 12. The extent of the drying openings 10 is in each case relatively small such that a free movement of the covers 12 is readily possible in the installed state of the insulation pack 8. It is conceivable for opening widths from 1 to 25 mm, particularly preferably 1 to 10 mm, and in particular 1 to 5 mm, to be provided.

In order for a covering of the insulation pack 8 across a large area to be achieved by drying openings 10 of this type, a relatively large number of such drying openings 10 can consequently be used. One insulation pack 8 could include more than ten, however in particular hundreds, thousands, or more, drying openings 10 of this type. This can however also depend on the installation conditions of the respective insulation pack 8.

Additionally to the drying openings 10, ventilation openings which are not shown in the figures and are in particular used for equalizing pressure differentials in the interior of the insulation pack 8 can furthermore also be provided.

Figure 3A:
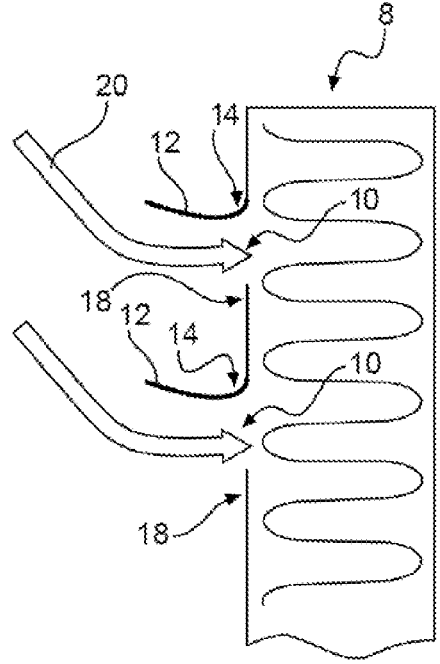
FIGS. 3a and 3b show an installation pack having open drying openings, where the drying openings in FIG. 3b are attached to an inserted strip.

FIG. 3a shows the covers 12 in an opened state in which said covers 12 extend outward from the associated drying opening 10. On account thereof, air 20 can infiltrate the interior of the insulation pack 8. The air infiltrating the insulation pack 8 from the outside is in specific cases always dryer than the air enclosed in the insulation pack and, on account thereof, can initiate drying, or introduce dry air, respectively, such that the relative air humidity in the interior of the insulation pack 8 drops.

Figure 3B:
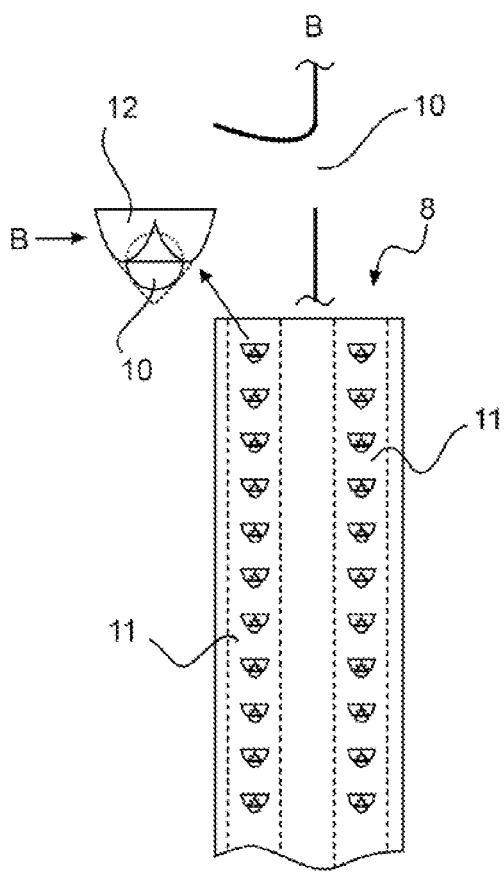

FIG. 3b shows the insulation pack 8 in a front view by way of two detailed views. The drying openings 10 here are implemented in two strips 11 which extend on peripheries of the insulation pack 8. The strips 11 can replace a conventional casing film 6 on the peripheries of the insulation pack and reduce the complexity in production, since the casing film 6 does not have to be fully populated with drying openings 10 and in particular is not embodied so as to be completely two-tiered. The covers 12 in an exemplary manner have a substantially triangular design and in FIG. 3b can be seen in an at least partially rolled-up state.

Figures 4, 5, 6:
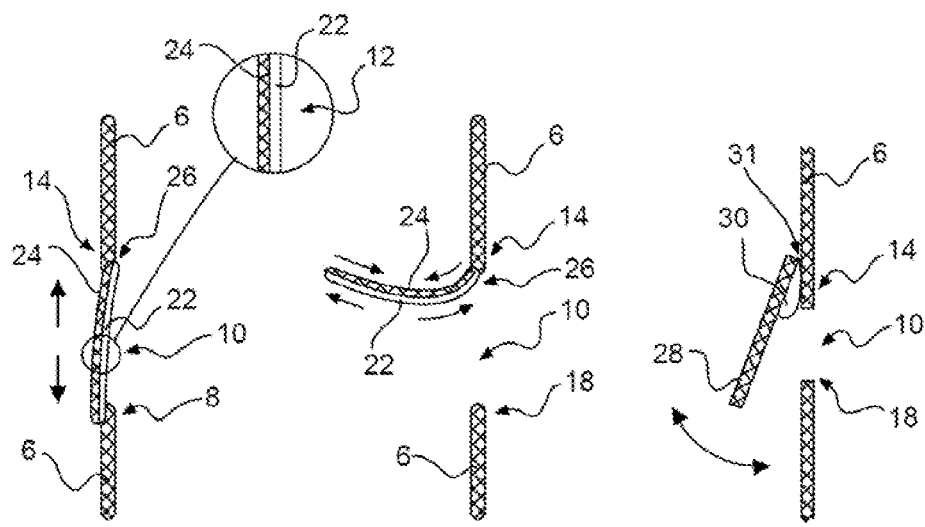
FIG. 4 shows a drying opening having a cover in a detailed illustration, wherein the drying opening is closed.
FIG. 5 shows a drying opening having a cover in a detailed illustration, wherein the drying opening is opened.
FIG. 6 shows a drying opening which is closable by way of a rigid cover.

The functional principle of the covers 12 can be seen in FIGS. 4 and 5. A cover 12 has a coating 22 which is applied to one side and which is composed of a hygroscopic or swelling-capable material, respectively, and has the property of performing expansion in the case of increasing moisture. On account of the expansion, the length of the coating 22 is larger than the length of a film 24 or another carrier layer such that the rolling-up movement in FIG. 5 arises. The cover element 12 consequently moves away from the drying opening 10 (see FIG. 5). The cover 12 is closed if the coating 22 does not swell (see FIG. 4). A type of hinge region 26 about which the cover 12 opens is formed at the first opening edge 14.

FIG. 6 shows a modification having a rigid cover 28 which is connected to the casing film 6 and at least in regions has a coating substance 30. The cover 28 can be folded away from the second opening edge 18 on account of the swelling of the coating substance 30. To this end, the cover 28 on one side could be disposed on the casing film 6 by way of a material strip such that a hinge region 31 results there.

Figure 7:
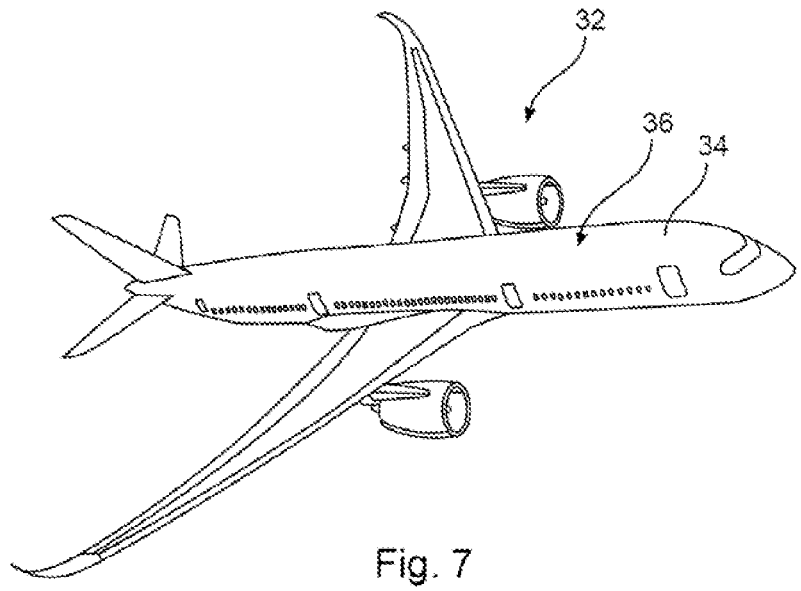
FIG. 7 shows an aircraft having an aircraft hull in which an interior space is equipped with at least one insulation pack.

FIG. 7 finally shows an aircraft 32 having a hull 34 and an interior space 36 formed in the latter, at least one insulation pack 8 being disposed in said interior space 36.

Additionally, it should be noted that "having" does not exclude any other elements or steps and "a" or "an" does not exclude a multiplicity. It should furthermore be noted that features which have been described in the context of one of the above embodiment examples can also be used in combination with other features of other embodiment examples described above. Reference signs in the claims should not be regarded as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An insulation pack for thermally and acoustically insulating an aircraft, comprising:
    a mat of an insulation material; and
    a casing film which completely encases the mat;
    wherein the casing film has a plurality of drying openings, each of the drying openings being closable by a cover that is connected to the casing film;
    wherein each cover at least in regions has a coating substance, the planar extent of the latter varying as a function of the relative air humidity of the air in the interior of the insulation pack such that each cover as a function of said air humidity moves relative to the casing film; and
    wherein the covers are adapted for assuming an orientation which, below a predetermined relative air humidity, closes the associated drying opening and which, at higher relative air humidity values, at least partially opens the associated drying opening.

2. The insulation pack according to claim 1, wherein the cover is flexural.

3. The insulation pack according to claim 1, wherein the cover is rigid.

4. The insulation pack according to claim 1, wherein the coating substance has an absorber which in terms of the volume thereof increases when absorbing moisture.

5. The insulation pack according to claim 4, wherein the coating substance is capable of reversibly swelling.

6. The insulation pack according to claim 1, wherein the coating substance comprises at least one bipolar cross-linked polymer.

7. The insulation pack according to claim 1, wherein the coating substance comprises at least one swelling-capable copolymer.

8. The insulation pack according to claim 1, wherein the coating is disposed on an internal side of the cover.

9. The insulation pack according to claim 1, wherein the cover has a non-woven material as a carrier material.

10. The insulation pack according to claim 1, wherein the cover is formed from a portion of the casing film which has an edge that coincides with an opening edge of the associated drying opening.

11. The insulation pack according to claim 10, wherein the portion on the periphery has a tab for overlapping peripheries of the associated drying opening.

12. The insulation pack according to claim 1, wherein the drying openings are at least in part embodied so as to be circular, oval, or triangular.

13. An aircraft comprising:
    an aircraft hull having an interior space formed therein; and
    at least one insulation pack disposed in the interior space, each insulation pack comprising a mat of an insulation material and a casing film which completely encases the mat;
    wherein the casing film has a plurality of drying openings, each of the drying openings being closable by a cover that is connected to the casing film;
    wherein each cover at least in regions has a coating substance, the planar extent of the latter varying as a function of the relative air humidity of the air in the interior of the insulation pack such that each cover as a function of said air humidity moves relative to the casing film; and
    wherein the covers are adapted for assuming an orientation which, below a predetermined relative air humidity, closes the associated drying opening and which, at higher relative air humidity values, at least partially opens the associated drying opening.

14. The aircraft according to claim 13, wherein:
    the aircraft hull has an internal side and an external side;
    a plurality of insulation packs are disposed on the internal side of the aircraft hull; and
    the drying openings are disposed on a side of the insulation packs that faces away from the aircraft hull.

15. The aircraft according to claim 13, wherein at least one insulation pack is disposed on an installation element which is fastened in the interior space.

* * * * *